Oct. 19, 1965   M. S. ENDERS   3,213,296
SOLID STATE TEMPERATURE ACTUATED CONTROL DEVICE
Filed Dec. 27, 1962   2 Sheets-Sheet 1

INVENTOR.
MARLIN S. ENDERS
BY EARL F. KOTTS
ATTORNEY

Oct. 19, 1965  M. S. ENDERS  3,213,296
SOLID STATE TEMPERATURE ACTUATED CONTROL DEVICE
Filed Dec. 27, 1962  2 Sheets-Sheet 2

INVENTOR.
MARLIN S. ENDERS
BY EARL F. KOTTS
ATTORNEY

United States Patent Office 3,213,296
Patented Oct. 19, 1965

3,213,296
SOLID STATE TEMPERATURE ACTUATED
CONTROL DEVICE
Marlin S. Enders, 1655 Chalcedony St.,
Pacific Beach, Calif.
Filed Dec. 27, 1962, Ser. No. 247,661
6 Claims. (Cl. 307—88.5)

The present invention relates to a sensitive, selective, and wide range temperature actuated device.

Many previous systems and circuits have been proposed for temperature control. A large number of these system use the balanced bridge principle. Some employ a temperature sensitive element such as a thermistor in one leg of the bridge. The thermistor has a negative coefficient of resistance. As the temperature of the thermistor changes, its resistance changes. This change in resistance alters the balanced condition of the bridge. Current flow resulting from the bridge, in its unbalanced condition, is utilized to actuate a control mechanism.

My device employs the negative temperature coefficient of an ordinary commercial transistor in a novel combination of elements to provide an unusually effective temperature actuated device.

It is well known that a transistor is temperature sensitive, and has a negative coefficient of resistance. This is considered a disadvantage in common practice, since it is desired to maintain the transistor in a stabilized condition in the vast majority of applications.

The broad concept of employing a transistor to sense temperature change is not a completely novel concept in itself. However, my device comprises an arrangement of elements which results in highly unusual sensitivity and control.

It is an object of the present invention to provide a temperature actuated device which is extremely sensitive, which provides a wide selection of temperatures, and which is highly efficient in operation.

It is another object of the present invention to provide a temperature actuated device which utilizes low cost standard components.

It is a further object of the present invention to provide such a device which has a long, trouble-free service life when used in its designed application.

Circuit description

Figure 1:
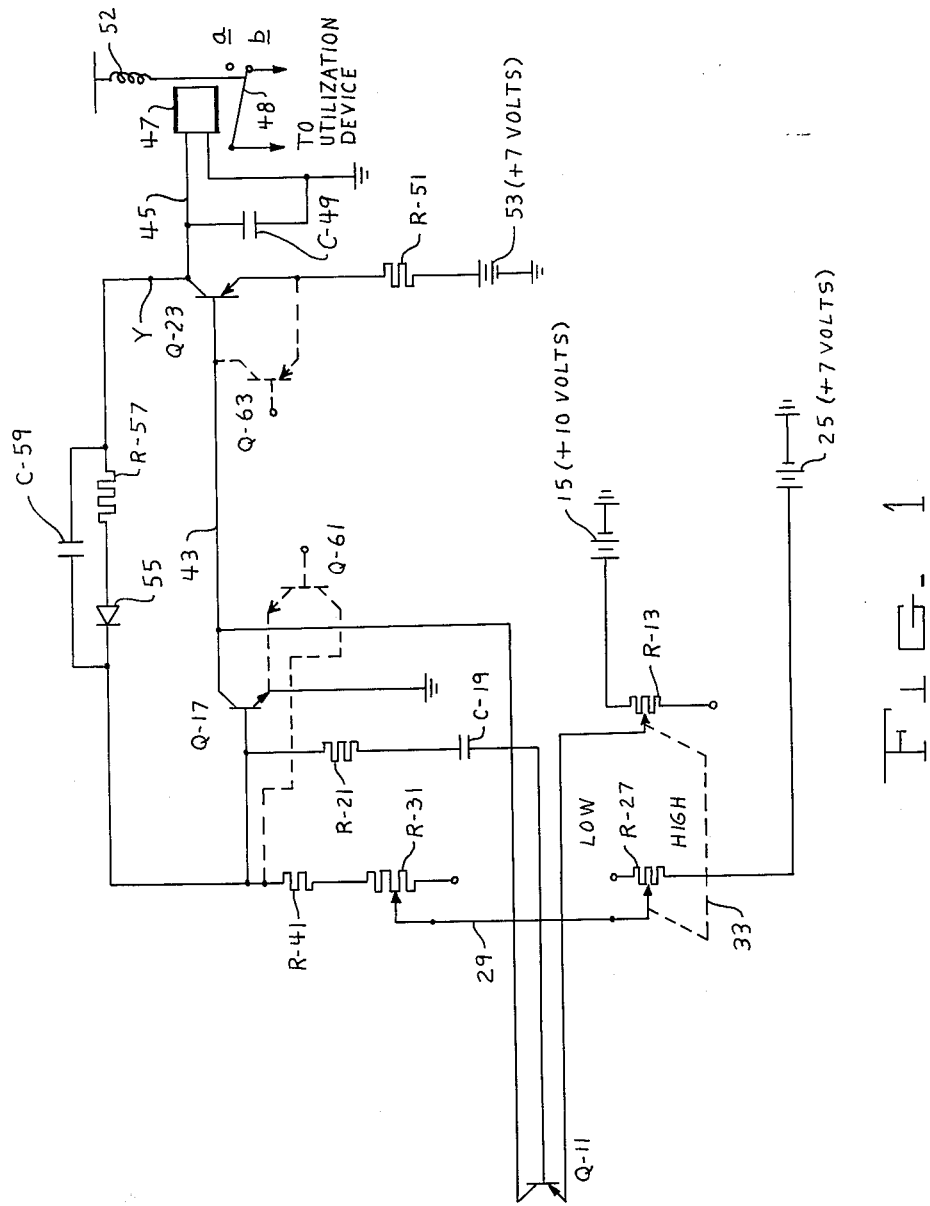
FIG. 1 is a schematic wiring diagram showing the present invention.

Referring to the drawings, a sensing element in the form of a standard commercial P-N-P transistor, such as a 2N190 for example, is shown at Q–11. The emitter of Q–11 is connected to the wiper of a variable resistor R–13. Resistor R–13 is connected to a suitable D.C. potential source such as illustrated representatively by a battery 15. This source is a positive ten volts for example. The base of Q–11 is coupled to the base lead of an N-P-N biasing transistor Q–17 through capacitor C–19 and resistor R–21. The collector lead of Q–11 is connected to the collector lead of biasing transistor Q–17 and to the base lead of a P-N-P output transistor Q–23. The emitter lead of Q–17 is connected to ground. A swamping resistor may be employed in the emitter lead in some applications.

Another source of D.C. potential is shown at battery 25. This source provides a positive potential of seven volts for example. The source is connected to one end of variable resistor R–27. The wiper of variable resistor R–27 is connected through lead 29 to the wiper of variable resistor R–31.

Figure 3:
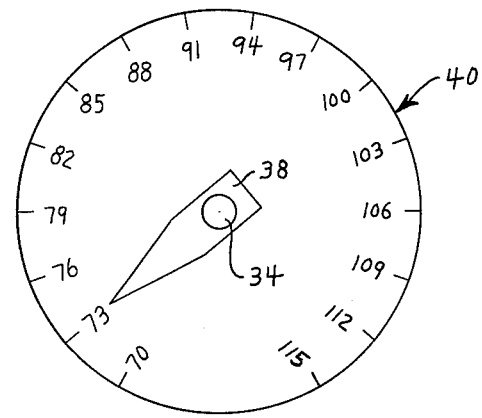
FIG. 3 is a front elevation of the dial used to adjust variable resistors R–13 and R–27, and a dial card graduated with a range of temperatures.

It will be noted at the dotted line 33 that the wipers for variable resistors R–13 and R–27 are joined mechanically, and are thus controlled by a common rotatable shaft 34 which is affixed to a dial pointer 38 shown in FIG. 3. The dial card 40 reflects a sample of the temperature range which variable resistors R–13 and R–27 would provide.

Variable resistor R–31 is connected through fixed resistor R–41 to the base lead of transistor Q–17 to establish a pre-determined temperature range bias, and to adjust the bias level of Q–17 for compensating purposes as will be explained later.

Resistor R–41 is installed in the base lead of transistor Q–17 to limit the bias voltage at the base of Q–17.

Conductor 43 extends from the collector lead of Q–17 to the base lead of Q–23. Conductor 45 extends from the collector lead of output transistor Q–23 through relay 47 to ground. Capacitor C–49 is connected in parallel with relay 47.

The emitter lead of output transistor Q–23 is connected through a swamping resistor R–51 to a source of D.C. potential 53 which provides a positive source of seven volts for example. In some applications, the swamping resistor may be eliminated.

A pulsing feedback circuit is connected from the collector lead of Q–23 to the base lead of Q–17. This circuit includes a diode 55 in series with a resistor R–57, and a capacitor C–59 in parallel with diode 55 and resistor R–57. The function of this circuit is explained at a later point.

In many cases transistors do not have the same characteristics, even transistors of the same type made by the same manufacturer. Replacing any of the transistors Q–11, Q–17 and/or Q–23 could cause a slight misalignment of the temperature dial pointer over the dial card temperature range. Compensation is accomplished by adjusting resistor R–31, which readjusts the base lead bias of Q–17 to the proper bias level to again cause proper tracking of the dial pointer 38 over the dial card 40 (FIG. 3).

In addition, the temperature range may be shifted in a higher or lower direction by adjustment of resistor R–31 to establish a different bias level at the base lead of Q–17. This would also be reflected to conductor 43, and consequently affect the low and high temperature ends of dial card 40 of FIG. 3.

General operation

The operation of the device will now be discussed in connection with a control for a heating plant, although it is to be understood that this device may be used in many other applications.

Let us assume that the space to be maintained at a particular temperature is below the desired temperature, and the pointer 38 has been adjusted to the desired temperature indicated on dial card 40, FIG. 3. This setting establishes a specific bias level at the base of transistors Q–17 and Q–23. Sensing transistor Q–11 is located in any desired location in the space to be heated, and the ambient temperature, which is low, causes sensing transistor Q–11 to exhibit a high resistance characteristic. In this condition, there is a negative bias at the base lead of output transistor Q–23. Output transistor Q–23 is conducting, and the resultant current flow has caused relay 47 to move the armature 48 to position $b$. In this position, the utilization device (in this case a furnace) is actuated.

As the furnace now heats the surrounding space and the sensing transistor Q–11, the negative resistance characteristic of Q–11 becomes apparent. The resistance of Q–11 is reduced, causing a lower emitter-collector voltage drop across Q–11, which now places a more positive voltage at the base of Q–23, biasing Q–23 to cut-off. Relay 47 restores, and the relay armature 48 is moved to position *a* by spring 52. In this position the circuit to the furnace is broken, and the furnace is shut off. As soon as the sensing transistor Q–11 reaches a point below the preselected value, relay 47 will again be actuated to start the furnace and repeat the cycle.

If the physical location is such that biasing transistor Q–17 and/or output transistor Q–23 are also subjected to changing temperature, they can be stabilized. Ordinary commercial transistors, shown in phantom as Q–61 and Q–63, are connected to transistors Q–17 and Q–23 in an opposing arrangement with the bases of the stabilizing transistors open. Any thermally caused resistive change in the biasing and/or output transistor will be offset by a like resistive change in the accompanying stabilizing transistor.

Figure 2:
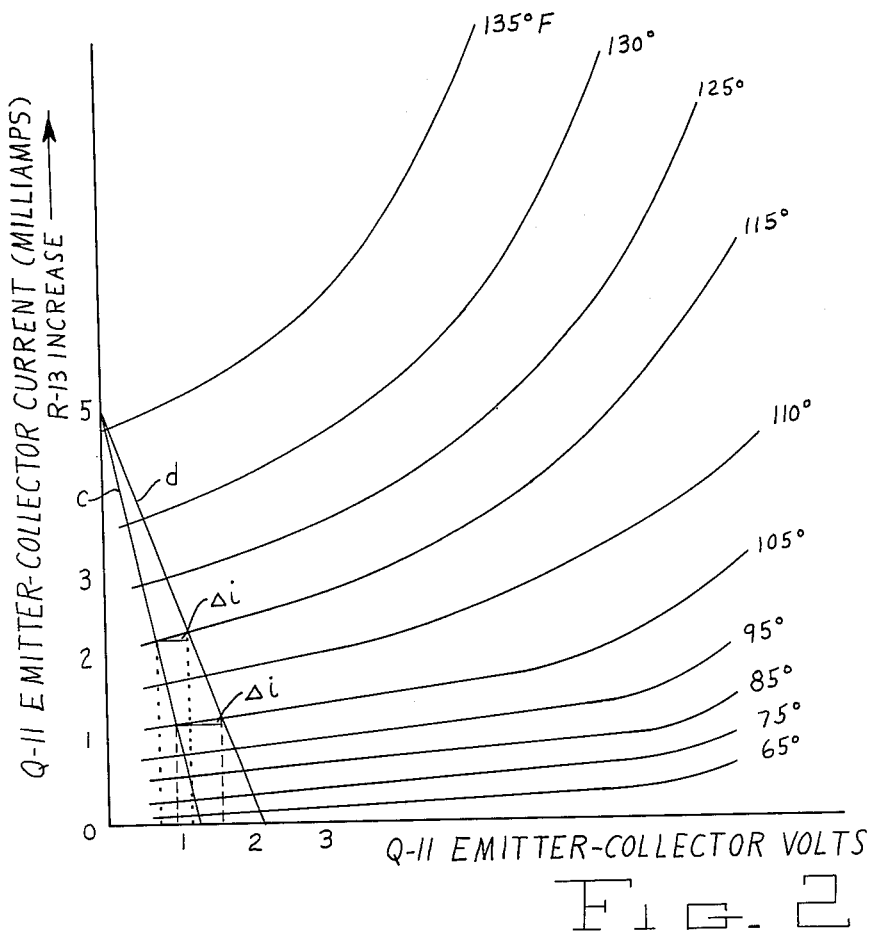
FIG. 2 is a graph of temperature curves for a particular sensing transistor.

More detailed operation of the device can be visualized from the graph shown in FIG. 2 of the drawings. The graph shows a family of curves for sensing transistor Q–11, for example a 2N190, wherein each curve represents a particular temperature as indicated. Emitter-collector voltage is represented on the X-axis, and emitter-collector current is represented on the Y-axis. The general direction of resistance increase of variable resistor R–13 is indicated alongside the Y-axis.

Lines *c* and *d*, which were determined in actual operation of a prototype device, connect points on the family of curves which represent voltage drops across sensing transistor Q–11 for a condition wherein relay 47 (FIG. 1) is operated to the actuated and/or restored position.

Perpendicular broken lines have been dropped from intersecting points on the 105-degree curve and lines *c* and *d*, to the X-axis, which indicates a .37-volt drop across sensing transistor Q–11 at 105 degrees due to the effect of the temperature change.

The increment of current change resulting from this voltage drop is delta *i* which is in the microampere range.

Maintaining the "on-off" condition of relay 47 (FIG. 1) in the lower and most linear portion of the curves of FIG. 2 is accomplished by variable resistors R–13 and R–27. For example, if it is desired to maintain a temperature of 115 degrees F., the voltage drop across sensing transistor Q–11 will be approximately .24 volt as indicated by the dotted lines extending from the 115-degree curve of FIG. 2. This voltage drop is less than that of the 105-degree curve in that the voltage drop across R–13 has been increased to compensate for the increased saturation current ($I_{cbo}$) at this higher temperature. Also, it is noted that at this higher temperature the curves are somewhat steeper, and quickly depart from linearity. This is the reason for causing the voltage drops to be less at the higher temperatures.

In addition, the resistance of variable resistor R–27 has been decreased, thus placing a more negative bias at the base of output transistor Q–23. This means that now a more positive voltage must reach lead 43 (FIG. 1) to again bias output transistor Q–23 toward cutoff.

The current change indicated at delta *i* in FIG. 2, occurring from a temperature change and causing a more positive voltage, increases slightly as variable resistors R–13 and R–27 are adjusted to a higher temperature. The reason is that the negative bias at the base lead of output transistor Q–23 is made more negative as the pointer 38 (FIG. 3) is moved toward a higher temperature setting. Therefore, the positive voltage from the collector lead of sensing transistor Q–11 must be increased accordingly to bias output transistor Q–23 toward cutoff and restore relay 47.

Accuracy, sensitivity and broad range are accomplished by maintaining the operation of the sensing transistor Q–11 in the lower, most linear portion of the curves of FIG. 2. This is a combined function of variable resistors R–13 and R–27.

At the higher temperature settings, variable resistor R–13 (FIG. 1) is moved down to introduce a higher resistance in series with the sensing transistor Q–11 emitter-collector circuit. At the same time, variable resistor R–27 is moved down, introducing a lower resistance in the biasing circuit to the base of biasing transistor Q–17. This occurs because the wipers are mechanically connected together by shaft 34 (FIG. 3).

As the resistance of variable resistor R–27 is decreased, the bias voltage at the base of the biasing transistor Q–17 becomes less negative (more positive) thus driving the N-P-N biasing transistor Q–17 toward higher conduction. This places a less positive (more negative) voltage at the base of the P-N-P output transistor Q–23 due to the increased resistance of variable resistor R–13. A higher voltage drop now exists through R–13 from voltage source 15 (FIG. 1) to the emitter-collector circuit of sensing transistor Q–11. Relay 47 is now energized, and the armature 48 is at position *b*.

Again, assume an increase in ambient temperature. As the voltage drop across sensing transistor Q–11 becomes less, due to decreased inherent resistance resulting from the increasing temperature, the positive voltage from source 15 (FIG. 1) will overcome the existing negative voltage present at the base of output transistor Q–23 from the collector of transistor Q–17. This positive voltage will bias the base of output transistor Q–23 positive (less negative) to restore relay 47 and move armature 48 to position *a* of FIG. 1.

From this it is apparent that the negative bias for driving output transistor Q–23 into conduction is derived from the collector lead of biasing transistor Q–17, and the positive biasing voltage for driving Q–23 toward cutoff is obtained from the collector lead of sensing transistor Q–11. The bias levels have values which depend upon the position of pointer 38 (FIG. 3) and the temperature affecting sensing transistor Q–11.

Design values for variable resistors R–13 and R–27 are influenced mainly by the types of transistors selected for the biasing transistor Q–17, and in some applications sensing transistor Q–11, to keep the "on" and "off" points of relay 47 (FIG. 1) in the lowermost linear portion of the curves of FIG. 2 as indicated by lines *c* and *d*.

In brief, the particular desired range of temperatures is established by the control comprising variable resistors R–13, and R–27 in combination with the particular sensing transistor Q–11.

With the range established, a particular temperature is selected. If this selection is at the low end of the temperature range, all of the resistance of R–27 is introduced into the biasing arrangement to the base lead of biasing transistor Q–17. This makes the base lead of Q–17 more negative (less positive), and moves biasing transistor Q–17 into a state of lower conduction, since Q–17 is an N-P-N type transistor, increasing the resistance across transistor Q–17 so to speak. The bias voltage at the base of output transistor Q–23 is made less negative, but transistor Q–23 is still maintained in a conduction state.

At low temperatures, the sensing transistor Q–11 exhibits a high emitter to collector resistance. For this reason no resistance is introduced into the sensing transistor emitter-collector circuit by variable resistor R–13, and the full voltage from voltage source 15 now exists at the emitter of sensing transistor Q–11. However, the voltage at the collector of transistor Q–11 is somewhat less than the value of the biasing voltage from the collector of biasing transistor Q–17.

A temperature increase at sensing transistor Q–11 will decrease the inherent resistance of Q–11, reducing the voltage drop across sensing transistor Q–11, and creating a path for current flow from ground at the emitter of biasing transistor Q–17 via the emitter-collector of Q-17 through sensing transistor Q-11 to positive battery voltage source 15 of FIG. 1. This will introduce a less negative (more positive) voltage at the base of output transistor Q-23 and drive Q-23 toward cutoff. Relay 47 restores, and armature 48 returns to position *a*.

As the control, R-13 and R-27 of FIG. 1 (actuated by shaft 34 and pointer 38 of FIG. 3), is moved to say mid position of the dial card 40 of FIG. 3, the resistance of R-27 is decreased, placing a more positive voltage at the base lead of biasing transistor Q-17 from voltage source 25 (FIG. 1). Transistor Q-17 moves into greater conduction and places a more negative (less positive) voltage at the base of output transistor Q-23. Output transistor Q-23 now conducts more, and relay 47 is operated with armature 48 at position *b* (FIG. 1).

The resistance of variable resistor R-13 is increased to cause a voltage drop (IR drop) and reduce the voltage at the emitter of sensing transistor Q-11. A temperature increase at sensing transistor Q-11 coinciding with the pointer 38 (FIG. 3) again decreases the inherent resistance of sensing transistor Q-11, reducing the voltage drop still further across Q-11.

A current path again is provided for the negative voltage existing at the base of output transistor Q-23, and less negative (more positive) voltage again predominates; output transistor Q-23 is biased to cutoff; and relay 47 (FIG. 1) restores with the armature 48 contacts at position *a*.

Moving the control pointer 38 to the high temperature end of dial card 40 (FIG. 3) removes all resistance from variable resistor R-27, and introduces the total resistance of variable resistor R-13 into the sensing transistor Q-11 emitter-collector circuit. This places a still higher positive bias at the base lead of biasing transistor Q-17, shifting Q-17 to a still higher conduction, and placing a more negative (less positive) voltage at the base lead of output transistor Q-23. Transistor Q-23 conducts, energizing relay 47 and moving the armature 48 contacts to position *b* (FIG. 1).

If the pointer 38 is moved to the high end of dial card 40 (FIG. 3), the temperature is increased at the sensing transistor by the furnace to coincide with dial pointer 38. This reduces the inherent resistance of sensing transistor Q-11, causing a still smaller voltage drop across Q-11. However, with a larger voltage drop now existing across variable resistor R-13, only the required positive voltage will reach lead 43 (FIG. 1) to again provide a current path for the negative voltage that exists at the base lead of output transistor Q-23. This will bias Q-23 less negative (more positive) to again restore relay 47 and move armature 48 to position *a*.

For example, the increment of current change delta *i* will be between lines *c* and *d* at the 115-degree curve line of FIG. 2 for this mode of operation.

*Pulsing action*

When the output transistor Q-23 is in a steady state of full conduction or cutoff, the pulsing which will be described hereafter does not occur. However, when a change of temperature at sensing transistor Q-11 causes a changing current in output transistor Q-23, then a pulsing action occurs.

The present device has been created with cost in mind. In keeping with this principle, it is desirable to be able to use an inexpensive relay. However, in maintaining my aim for an efficient and relatively trouble-free unit, such an inexpensive relay must perform effectively.

I am able to avoid the use of a more expensive, polarized relay by providing pulsing components in my device. If a conventional non-polarized relay is used without the pulsing effect, certain problems arise. For example, if the current through the coil of relay 47 increases smoothly and gradually, the armature 48 will be gradually drawn toward the closed position *b*. At a certain position arcing will occur between the contact points. This results in oxidation of the points and resultant poor contact.

The contact points close and open suddenly when pulsing is used. When the pulses reach a certain amplitude, the relay points snap shut. When the pulses attenuate below a certain amplitude, the relay snaps open. The detailed operation of how the pulses are produced will now be defined.

Assuming that the sensing transistor Q-11 is below the desired temperature, output transistor Q-23 is negatively biased at its base and is at full conduction. Current flows through output transistor Q-23, and relay 47 is energized with relay armature 48 in position *b*, closing the circuit to the utilization device. Since the current flow through Q-23 is steady, there is no pulsing.

Now, assume that the temperature at sensing transistor Q-11 is rising. This causes the inherent resistance of Q-11 to decrease. As the resistance of Q-11 decreases, more positive voltage from source 15 is passed to the base of output transistor Q-23. The base current in Q-11 is now also changing due to the change in resistance of Q-11. This causes capacitor C-19 to charge and then discharge over resistor R-21 into the base of biasing transistor Q-17. The result is a series of pulses or voltage oscillations. These pulses in the base of Q-17 cause a pulsing through conductor 43 to the base of output transistor Q-23. This results in pulses through the lead 45 to the relay 47 and capacitor C-49.

Capacitor C-49 has a value which ties in to the operating characteristics of relay 47, and keeps the relay below the chatter point. When the pulses through relay 47 fall below the voltage value necessary to hold the relay 47 energized, the spring 52 will suddenly and forcefully open the contact points in relay 47 as the armature 48 is moved to position *a*. Sometimes the points in an inexpensive relay tend to stick. The pulsing effect provides a fast changing current which will restore relay 47 when the proper value is reached for spring 52 to pull armature 48 to position *a*.

When the relay 47 is open, and a steady current state exists in output transistor Q-23, no pulsing occurs.

Then as the sensing transistor Q-11 cools, its resistance increases. Now, less positive voltage is passed from source 15 to the base of output transistor Q-23 and the base moves toward negative bias and greater conduction. The point marked Y adjacent the collector of Q-23 (FIG. 1) now becomes more positive. This positive voltage, pulsed by the network comprising diode 55, resistor R-57 and capacitor C-59, reaches a predetermined value which causes the relay armature 48 to suddenly snap to position *b*.

Pulses below the predetermined values are filtered out by capacitor C-49 to eliminate chatter in relay 47.

It has been found that exact stabilization can be obtained by placing a resistor of suitable value in series with the stabilizing transistor Q-61 or Q-63.

Also, the heating of a space can be tied in with outside temperature by subjecting the stabilizing transistor Q-61 to outside temperature. For instance, if the present device is used in conjunction with heating a home, the stabilizing transistor Q-61 can be placed outside the home or in an unheated place such as the attic.

Let us assume that the control is set for 72 degrees. If the weather is cold, the stabilizing transistor Q-61 exhibits a high resistance and the base of biasing transistor Q-17 becomes more positive causing conduction, which biases output transistor Q-23 to conduction and actuates relay 47. Thus, the stabilizing transistor Q-61 causes the relay to actuate in advance of 72 degrees space temperature when the weather is cold.

If the weather is warm, then the stabilizing transistor Q-61 exhibits a low resistance and the base of biasing transistor Q-17 becomes more negative. In this situation, actuation of relay 47 lags the 72-degree setting, i.e., the relay is actuated late.

The various transistors which are employed operate at about thirty percent of capacity, so they enjoy an exceptionally long service life. The device is compact and may be used with batteries and/or rectified A.C. power supplies.

Only the range control (R–13 and R–27) and the compensating control (R–31) need be accessible for adjustment. The remainder of the device may be remotely installed in any convenient or desired location.

Power requirements may be very small since only a few microamperes of biasing current is drawn by the device with Q–23 at cutoff. Only four to seven milliamps of current will be drawn normally when the output transistor Q–23 is at full conduction.

Having thus described my invention, I claim:

1. A sensitive, wide range, solid state temperature actuated control, comprising:
   an output transistor for connection to a utilization device;
   a biasing transistor of opposite configuration to said output transistor having its output connected in biasing relation to said output transistor;
   a sensing transistor with a resistance characteristic which is a function of temperature, the output of said sensing transistor being connected in biasing relation to said output transistor; and
   adjustable resistance means connected between said sensing and biasing transistors and a voltage source;
   said adjustable resistance means maintaining the operation of said sensing transistor within the substantially linear portion of its emitter-collector voltage–emitter-collector current curves over a range of temperatures.

2. A sensitive, wide range, solid state temperature actuated control device comprising:
   a sensing transistor having an emitter, a base, and a collector, the emitter being connected through a first variable resistor to a voltage source, and the collector being arranged for connection to a utilization device;
   a biasing transistor having an emitter, a base, and a collector, the base of said biasing transistor being connected with the base of said sensing transistor, and the emitter being connected to ground;
   a second variable resistor connected between a voltage source and the base of said biasing transistor, said first and second variable resistors being arranged for simultaneous adjustment in directions of opposite value;
   an output transistor of opposite configuration to said biasing transistor and having an emitter, a base, and a collector, the base being connected to the collector of said biasing transistor and the collector of said sensing transistor, and the emitter being connected to a potential source; and
   wherein the temperature of the sensing transistor affects the resistance of said sensing transistor and adjusts the bias at the base of said output transistor to operate said utilization device.

3. A solid state temperature actuated control device, comprising:
   an output transistor for connection to a utilization device;
   a biasing transistor of opposite configuration to said output transistor connected to the input of said output transistor for establishing a biasing level in the output transistor; and
   a sensing transistor connected to the input of said output transistor to affect the bias of said output transistor, said sensing transistor having a resistance characteristic which is a function of temperature.

4. A sensitive, wide range, solid state temperature actuated control, comprising:
   an actuating transistor for connection to a utilization device to actuate said utilization device, the operation of said actuating transistor being controlled by an input which changes with temperature variations;
   a variable biasing means connected to the input of said actuating transistor for establishing a predetermined bias level; and
   a temperature sensing transistor with its output connected to the input of the actuating transistor and the output of said variable biasing means so that the output variations of said temperature sensing transistor directly influence the biasing of the actuating transistor in relation to the temperature of said temperature sensing transistor;
   said temperature sensing transistor having a resistance characteristic which is a function of temperature.

5. A solid state temperature actuated control device, comprising:
   an output transistor for connection to a utilization device;
   a biasing transistor with its output connected to the input of said output transistor;
   a sensing transistor having a resistance characteristic which is a function of temperature connected to the input of said output transistor to affect the bias of said output transistor; and
   variable biasing means for simultaneously rebiasing said biasing transistor and said sensing transistor.

6. A sensitive, wide range, solid state temperature actuated control, comprising:
   circuit means including a first transistor wherein a predetermined second transistor voltage bias level is established at a control point at the output of said first transistor, and a temperature dependent voltage is generated at the said control point; and
   a second transistor of opposite configuration to the first transistor for use with a utilization device to operate the utilization device, said second transistor connected with its input to the control point of said circuit means whereby the condition of conduction of said second transistor and the resultant operation of the utilization device is controlled solely by a voltage dependent entirely upon temperature variations in relation to the predetermined bias level.

References Cited by the Examiner

UNITED STATES PATENTS

| 2,871,376 | 1/59 | Kretzmer | 307—88.5 |
| 3,050,644 | 8/62 | Ironside | 307—88.5 |
| 3,067,340 | 12/62 | Hodges | 307—88.5 |

OTHER REFERENCES

Andrew: "The Thermistor in Biological Research," Electronic Engineering, September 1947, page 288.

JOHN W. HUCKERT, *Primary Examiner.*

ARTHUR GAUSS, *Examiner.*